Dec. 29, 1964  S. C. EINHORN  3,163,687
MOLDING ELASTIC POLYMERIC FOAMS
Filed Jan. 9, 1959
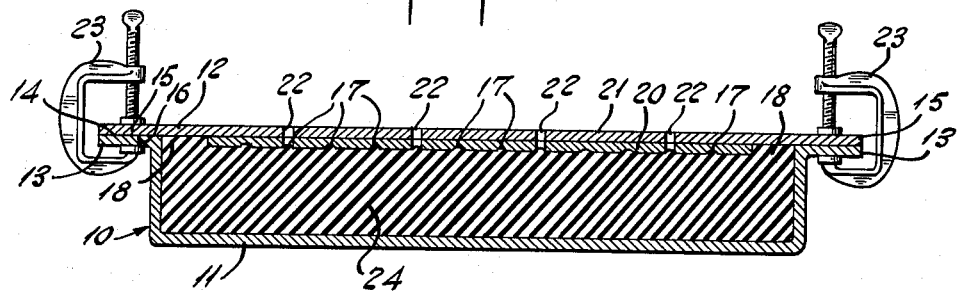
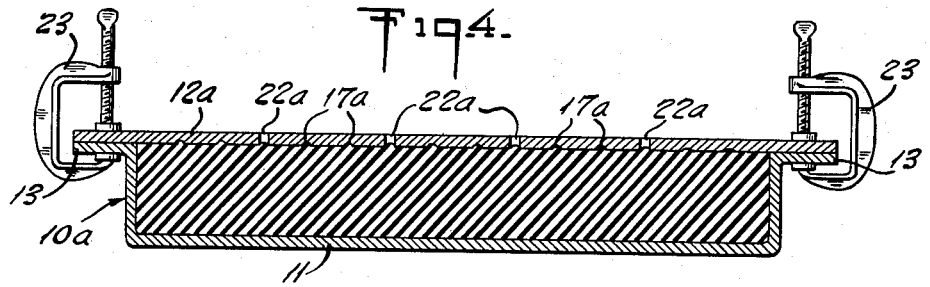
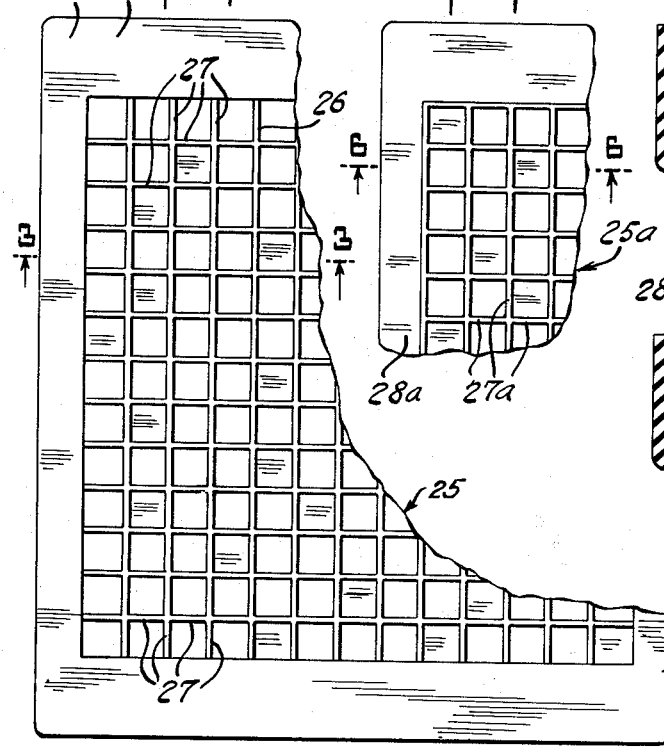
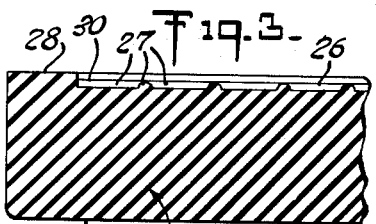
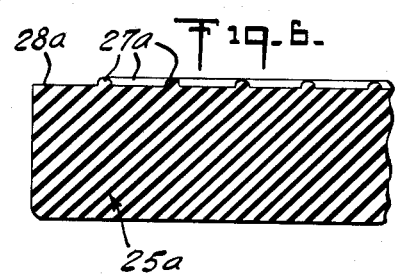
INVENTOR
STANLEY C. EINHORN
BY
Burgess, Ryan & Hicks
ATTORNEYS

3,163,687
MOLDING ELASTIC POLYMERIC FOAMS
Stanley C. Einhorn, Dover, N.J., assignor, by mesne assignments, to American Urethane, Inc., Franklin, N.J., a corporation of Delaware
Filed Jan. 9, 1959, Ser. No. 785,869
14 Claims. (Cl. 264—54)

The present invention relates to the art of molding elastic polyurethane foam articles, such as cushions, seats, and the like.

The art of making elastic polyurethane foams is generally well known. The basic ingredients are usually a polyhydroxyl compound, a diisocyanate, water, a catalyst, and an emulsifier. The polyhydroxy compound may be a polyalkylene ether glycol, a polyester, a polysulfide, castor oil, etc. The diisocyanate is usually a blend of tolylene diisocyanate isomers but may be a blend or solution of two or more diisocyanates. When the above ingredients are mixed together in the right proportions and under temperature and other conditions, which are well known in the art, an elastic foam having a three dimensional molecular network results from three general reactions which proceed quickly and more or less simultaneously. These reactions are (1) chain extension results from the reaction of the polyol and the diisocyanate, (2) cross-linking which results from the branching in the polyol and from complicated reactions of the diisocyanate with its own reaction products and (3) blowing which results from the reaction of water and the diisocyanate and from the carbon dioxide which is liberated. Some chain extension and branching may be accomplished prior to the mixing by prereacting the polyol and some or all of the diisocyanate to form a so-called prepolymer.

The molding of polyurethane foam presents a difficult problem not encountered in the shaping of other kinds of foams, such as latex foam. Some internal pressure is necessary to mold polyurethane foam articles, such as cushions or seats. This pressure results from a slight overfill with material and from confinement with a lid during molding. Since the reactive mixture undergoes twenty to thirty-fold expansion soon after mixing, it is necessary to allow the entrapped air to escape as the mixture expands in the mold. If the lid is provided with simple vent holes, the foam article produced will have visible depressions or cavities in the surface layer of the molded product. These depressions or cavities result from the fact that as the foam rises unevenly, it will contact parts of the lid at different times, thus trapping air before it has a chance to find a path to a vent hole. This results in the large voids or cavities on the surface of the molded article. Moreover, this uneven contact will occur at different places on the lid from pour to pour, since it is impossible to reproduce exactly a predetermined pouring distribution pattern, so that uniform production cannot be achieved.

If small intersecting or crossed channels are provided in the underside of the lid and are extended to lead along the mating faces of the lid and the bowl of the mold to the outside of said mold, the entrapped air will escape into the channels and vent out therethrough and due to the distribution of the air through the network of channels, the formation of surface cavities or voids is prevented but the overfill flowing into the channel will form intersecting ribs or ridges on the surface of the article extending to the edges of the article. It has been found in accordance with the present invention that although the provision of intersecting air channels in the lid of a mold extending to the perimeter or outside thereof, may be acceptable for the shaping of foam latex articles, such as cushions, when this arrangement is employed to mold foam polyurethane, the ribs of the polyurethane foam article will be hard and callous around the perimeter of the article and feel like hard rubber, while the rest of the article will have proper cushion softness.

It has been found in accordance with the present invention, that the reason for the adverse conditions described is the fact that with the polyurethane foam producing mixture, cross-linking progresses simultaneously with blowing and chain extension in the mold carry out the three reactions described, and the foaming mixture acquires a gel or coagulated character very early, prior to complete expansion in the mold, and will, therefore, tolerate only a minimum amount of distortion in directions other than vertical rise and cannot tolerate too much lateral shear or sidewise extension. When the limit of tolerance is exceeded, the films which border the $CO_2$ gas cells in the foam break down and coalesce and create hard horny regions where these cells have collapsed. Where the expanding foam flows laterally along the intersecting channels in the lid to the periphery thereof, excessive deformation of this foam takes place near the regions of the perimetrical ends of these channels, and due to the instability of the molecular structure of the foam described at this stage of the development, this deformation causes collapse of the cells in these regions and the production of the hard callous edges of the ends of the ribs or ridges, as described. These hard edges are undesirable since the hardness can be felt through the upholstered product incorporating the cushion. Furthermore, the formation of composite cushion units by assembling two cushions face to face or a cushion to a pan, is difficult, since this requires either the two ribbed faces of the two cushions to be cemented together or the ribbed face of the cushion to be cemented to the plain face of the pan.

In the case of foamed latex, the filling out of the latex in the mold is accomplished while the foam is in plastic state and can be rearranged and/or extended by any amount of flow necessary to acquire the desired shape without the loss of continuous cellular structure. Cross-linking is accomplished separately by heating to react the rubber molecules and the cross-linking agents which are included in the formulation. Thus, the type of cross-channel formation in the lid extending to the outside of the mold for venting may be acceptable in connection with foam rubber molds, but is not desirable in molding polyurethane foam articles.

One object of the present invention is to provide a new and improved mold that avoids the drawbacks described in connection with the molding of polyurethane foam articles, such as cushions, seats and the like.

Another object of the invention is to provide a new and improved process for molding polyurethane foam articles, such as cushions, seats and the like that avoid the drawbacks described.

A further object of the invention is to provide a new and improved polyurethane foam cushion or seat made by a mold and the process embodying the present invention.

In accordance with certain features of the present invention, the intersecting channels in the lid do not extend to the atmosphere along the mating faces of the lid and bowl, but terminate short of the mating lines, and these faces are sealed against escape of air or flow of polyurethane foam therebetween. If the cushion thickness is small and the mold volume to area ratio is also small, vent holes are not necessary. Under these conditions, the overlying air will collect in the channels to form small voids in the ribs, which would otherwise be continuous. These voids in the ribs do not detract from the appearance of the cushion, since the ribs are small and follow a definite geometric pattern and the voids do not extend beyond said ribs, and are useful in that they add softness to the ribs. When the mold volume to area ratio is appreciable, it is desirable in accordance with the present invention to provide small vent holes through the lid, preferably at certain evenly distributed junction points of the channels.

The improved mold and process described, provide an effective method of controlling the entrapped air in the mold and will eliminate air pockets and at the same time result in soft corners at all mating or junction lines of the lid and bowl. The features of the invention described, in addition to eliminating voids resulting from entrapped air and producing a cushion or seat with soft edges, also provides a bottom face, i.e. the face having the intersecting ribs, with a smooth peripheral frame strip which lends itself nicely to all forms of assembly, such as the cementing of two cushions of similar types to form a reversible cushion unit, or the cementing of the cushion to a pan or other mounting device. In case where it is desirable to provide core openings in the article being molded, core pins may be mounted for the purpose in the lid in the areas between the channels.

Various other objects, features and advantages of the invention are apparent from the following description and from the accompanying drawings, in which FIG. 1 is a cross-section of a form of mold adapted to produce a cushion and constituting one embodiment of the present invention and illustrates a molding process in accordance with the present invention;

FIG. 2 is a fragmentary top plan view of the cushion formed by the mold and process shown in FIG. 1 and constituting one embodiment of the present invention;

FIG. 3 is a section of the cushion taken on lines 3—3 of FIG. 2;

FIG. 4 is a cross-section of another form of mold adapted to produce another form of cushion and constituting another embodiment of the present invention;

FIG. 5 is a fragmentary top plan view of the cushion formed by the mold and process shown in FIG. 4 and constituting another embodiment of the present invention; and FIG. 6 is a section of the cushion taken on lines 6—6 of FIG. 5.

Referring to FIG. 1 of the drawing, there is shown a mold 10 comprising essentially of a bowl or vessel 11 having a molding cavity of the desired shape to produce the article required and a cover plate or lid 12 for said bowl. In the specific form shown, the article required is a cushion, pillow or seat and may be substantially of rectangular outline and substantially of rectangular cross-section as shown. The bowl 11 has a smooth continuous internal surface and is provided with a marginal flange 13 defining an upper flat lid seating surface 14 extending around the entire periphery of the bowl and desirably extending in a single plane. The lid 12 is substantially flat and has a marginal section 15 extending around its entire periphery and defining a lower flat surface 16 to mate with and seat on the bowl flange 13.

As a feature of the present invention, a series of intersecting channels or grooves 17 are provided on the underside of the lid 12 terminating short of the junction plane between the mating surfaces 14 and 16 of the bowl flange 13 and lid 12 respectively in assembled position of the bowl and the lid, and defining a space 18 of open rectangular shape between the ends of the channels and the inner sides of the bowl 11. This space 18 may be from ¼" to 2½", according to the size of the cushion to be produced.

As a further feature, a positive seal is provided between the two mating surfaces 14 and 16 of the bowl flange 13 and lid 12.

The network of channels may consist of two parallel sets of channels 17 crossing each other at a suitable angle, but a straight line pattern is most convenient and economical, since this can be produced by skiving. In the specific form shown, the network of channels 17 consists of two intersecting sets of straight equally spaced channels arranged parallel to the sides of the mold and at right angles to each other to form a rectangular lattice pattern.

In the specific form of the invention shown in FIG. 1, the lid is constructed, so that the top of the grooves do not extend above the top of the bowl in assembled condition of the mold. To that end, the lid 12 is stepped to provide a lower or inner projecting auxiliary plate 20 in which the channels 17 are formed. In the specific form shown, the lid 12 is of composite construction and comprises a cover plate 21 large enough to close the bowl 11 and to seat on the bowl flange 13 and having a smooth continuous inner face, and the channelled plate 20 is a separate plate rigidly secured to the underside of the cover plate, as for example, by welding or by screws, and smaller than the bowl cavity to define the rectangular space 18 between the sides of said channelled plate and the inner sides of the bowl 11. The channels 17 extend to the edges of the plate 20.

As far as certain aspects of the invention are concerned, the lid 12 may be of integral construction, in which case said lid is recessed and thereby stepped around its margin to provide the downwardly projecting channelled plate 20 for the purpose described.

The channels 17 may be of varied shape, width and depth. The depth of the channels may be up to ¼" but is preferably not more than ⅛" and the channels are preferably not wider than ⅛". These channels may be spaced at center to center distances up to 4" but are preferably spaced 1" to 2" apart.

If the cushion thickness is small and the mold volume to area ratio is also small, vent holes are not necessary. The overlying air in the mold will collect in the channels 17 as the mixture therein develops into foam and rises and if no vent holes are provided, the air collected in the channels will form small voids in what would otherwise be continuous ribs in the cushion, but these voids are not too noticeable and are useful in adding to the softness of the ribs.

When the mold volume to area ratio is appreciable, it is necessary to drill small holes ⅛" or smaller through the lid 12, indicated by the numeral 22, preferably at some of the junction points of the channels 17 and preferably equally spaced. With judicious location of these holes 22, sufficient air can be deliberately retained to create many small voids in the ribs, which add softness to the ribs as described above and which at the same time eliminate the deeper voids in the upper section of the cushion in the areas between the ribs.

The mating surfaces 14 and 16 of the bowl 11 and lid 12 respectively are desirably finished and trued to close tolerance to produce a sealing fit between these surfaces. and to assure against leakage between the lid and the bowl. However, as far as certain aspects of the invention are concerned, if a sealing fit is not provided between the bare contacting surfaces 14 and 16, a gasket or other means may be provided to seal the junction between the two surfaces.

In carrying out the process of the present invention, the reactive components of an elastic polyurethane foam producing mixture are added together by bringing these components together in the right proportions. The art of producing polyurethane foam is well known and the ingredients including the activator mixture may be of the general character described above. For example, the polyurethane mixture may be similar to that described in the U.S. Patent No. 2,764,565 and may be mixed in the manner similar to that described in said patent. Immediately after the polyurethane foam producing ingredients have been intimately admixed, the mixture is deposited as a thin layer over the bottom of the bowl 11, as uniformly thereover as possible, while the lid 12 is off, and in amounts to provide an overfill in the final expansion stage of the foam. Immediately after pouring, the lid 12 is seated on the bowl 11 with the channelled plate 20 centered with respect to the bowl and the lid is clamped tight to the bowl, as for example, by the C-clamps 23 applied to the marginal lid section 15 and to the bowl flange 13 and arranged all around the mold.

The mixture deposited over the bottom of the bowl 11 will immediately undergo the three reaction stages described above, and expand, producing a foam which rises vertically and gels, but which undergoes little or no lateral extension. As the foam rises, the air entrapped in the bowl 11 above the foam escapes through the vent holes 22, in case such holes are provided, or if the mold is shallow enough and consequently does not have the vent holes, the air fills the channels 17 in the lid 12 and is uniformly distributed throughout the channel network until the foam indicated by the numeral 24 in FIG. 1 reaches the lid, whereupon it overflows into the channels. Whatever air is entrapped in these channels 17 produces voids in the resulting ribs of the foam 24, which are larger than the uniform cells in the general homogeneous structure of the foam but which are confined to said ribs and tend to advantageously soften the ribs.

The mold after being filled in the manner described, is placed in an oven for from 10 to 20 minutes and the foam 24 therein is cured at a temperature of about 175° F. to produce the partly cured cushion. This partly cured cushion is then removed from the mold 10 and cured for from 2 to 16 hours at a temperature of about 175° to 250° F. to produce the cushion 25 shown in FIGS. 2 and 3. This cushion 25 will have a honeycomb formation 26, which is defined by ribs 27 where the foam has flowed into the channels 17 of the mold and which is encircled by a rectangular frame 28 having a continuous smooth surface and resulting from the spacing 18 between the ends of the mold channels 17 and the innersides of the bowl 11 in the molding process. The face 30 of the cushion 25, which bears the ribs 27 and the encircling frame 28 and which is produced at the top of the mold 10, constitutes in use the bottom of the cushion, while the opposite smooth continuous surface face 31 produced at the bottom of the mold constitutes in use the top seating part of the cushion.

The cushion 25 formed as described will be substantially free from voids resulting from entrapped air except in the ribs 27 and these voids are not objectionable but as a matter of fact are highly desirable, since they add to the softness of the ribs. Moreover, the cushion 25 will be substantially free of any hard callous edges or surfaces, but will have a highly soft elastic texture throughout its construction. Also, since the ribs 27 do not extend outwardly beyond the bottom smooth surface face of the frame 28 encircling said ribs. This construction lends itself admirably to all forms of assembly in the production of composite units. For example, two similar cushions 25 may be assembled with their frames 28 cemented face to face to produce a reversible cushion unit or the cushion 25 may be attached to a pan or other mounting means.

FIG. 4 shows another form of mold 10a in which the lid 12a, instead of being of stepped construction as described in connection with FIG. 1, is continuously flat across its entire lower surface except for the channels 17a but is provided with vent holes 22a as in the mold construction of FIG. 1, if this required by the size of the mold, so that the lid can be made from a single plate of uniform thickness. The lower flat surface of the lid 12a is formed with a lattice network of channels 17a, which is similar to that described in connection with FIG. 1 and which is similarly spaced from the inner sides of the bowl 11 to prevent the formation of hard callous edges and surfaces in the cushion as described in connection with FIG. 1. In all other respects, the mold 10a is the same as the mold 10 of FIG. 1 and the molding and curing process in connection with the mold 10a is carried out in the same way as was described in connection with that of FIG. 1 to produce a cushion 25a, as shown in FIGS. 5 and 6. This cushion 25a will be free from the defects of callous and hard edges, and will be similar in form to the cushion of FIGS. 2 and 3, except that the soft voided ribs 27a produced therein extend slightly outwardly beyond the face of the ribs encircling frame 28a.

Although in the construction of FIGS. 5 and 6, the ribs 27a of the cushion 25a extend outwardly beyond the face of the frame 28a, the cushion can still be united to a similar cushion with the two flat smooth continuous frames 28a of these cushions cemented face to face or to a mounting pan although not as effectively as in the construction of FIGS. 2 and 3, since the ribs 27a are not deep enough or hard enough to interfere with such assembly.

While the invention has been described with particular reference to specific embodiments, it is to be understood that it is not limited thereto but is to be construed broadly and restricted solely by the scope of the appended claims.

What is claimed is:

1. A mold for producing an article of elastic polymeric foam comprising a bowl having a molding cavity and a lid therefor, said bowl defining a seat around its periphery, said lid having a section around its entire periphery adapted to mate with said seat when said lid is in bowl covering position for molding, the junction between said seat and said lid section when said lid is in bowl covering position being adapted to be sealed, the inner face of said lid having a network of intersecting channels in direct communication with the bowl cavity in said position of the lid, said channels terminating short of the inner sides of said bowl in said position of the lid by at least one-quarter of an inch.

2. A mold as described in claim 1, wherein said lid contains one or more vent holes passing therethrough to the channels.

3. A mold as described in claim 1, wherein the mold is in a form to produce a cushion.

4. A mold as described in claim 1, wherein said bowl has a peripheral flange defining said seat.

5. A mold as described in claim 1, wherein said seat and said peripheral lid section have flat mating surfaces of sufficient trueness to create a sealing junction therebetween when clamped together.

6. A mold as described in claim 1, wherein the region of the inner face of said lid around said channel network is smooth and continuous to produce a corresponding marginal smooth frame in the article produced by the mold.

7. A mold as described in claim 1, wherein the inner face of the lid is stepped to present a projecting inner plate in which the channel network is formed and a smooth continuous inner surface around said plate.

8. A mold as described in claim 1, wherein the lid is of composite stepped construction, comprising a cover plate large enough to seat on the bowl and a separate auxiliary plate secured to the inner face of said cover plate and smaller than the top of the bowl cavity to extend into the bowl for molding and to define a space between the periphery of the auxiliary plate and the inner periphery of the bowl in bowl covering position of the lid, and wherein said auxiliary plate contains said channel network.

9. A mold as described in claim 1, wherein said lid has an inner face extending throughout its area in a single plane except for the interruption by the channels.

10. A mold for producing a cushion of elastic polyurethane foam, comprising a bowl having a molding cavity and a lid therefor, said bowl having a peripheral flange defining a seat, said lid having a section around its periphery adapted to mate with said seat when said lid is in bowl covering position for molding, the junction between said seat and said lid section when said lid is in bowl covering position being adapted to be sealed, said lid having its inner face stepped to present a projecting inner plate and a smooth continuous inner surface around said plate extending in a plane, said inner plate having two intersecting series of straight parallel channels extending only to the edges of said plate and having a depth that does not extend towards the outer side of the lid beyond said plane, said inner plate being smaller than the top of the bowl cavity by an amount sufficient to extend into the bowl for molding and to define a space between the periphery of said inner plate and the inner periphery of the bowl in bowl covering position of the lid of at least one-quarter of an inch.

11. A mold as described in claim 1, wherein the lid is continuously flat across its entire inner face except for the interruption by the channels.

12. A process of producing an article of elastic polyurethane foam comprising pouring the reaction mixture for said foam on the bottom of a mold bowl having a peripheral seat, placing on said seat a lid provided on its inner face with a network of intersecting channels terminating short of the inner peripheral sides of said bowl by at least one-quarter of an inch, sealing the junction between said lid and said seat, and curing the molded foam article.

13. A process as described in claim 12, wherein the bowl has a cavity shaped to mold a cushion and having a smooth continuous inner surface, and wherein the inner surface of the lid around said channel network is smooth and continuous to produce a cushion having on its underside a honeycomb rib formation surrounded by a frame with a smooth continuous surface.

14. A process as described in claim 12, wherein the bowl has a cavity shaped to mold a cushion and having a smooth continuous inner surface, the lid having its inner face stepped to present a projecting inner plate on which the channel network is formed and a smooth continuous inner surface around said plate extending in a plane.

References Cited in the file of this patent

UNITED STATES PATENTS

| | | |
|---|---|---|
| 1,645,248 | Lower | Oct. 11, 1927 |
| 1,877,527 | Moran | Sept. 13, 1932 |
| 2,001,305 | Gorham et al. | May 14, 1935 |
| 2,296,744 | Simmons | Sept. 22, 1942 |
| 2,325,903 | Blair et al. | Aug. 3, 1943 |
| 2,619,659 | Futterknecht | Dec. 2, 1952 |
| 2,690,987 | Jeffries et al. | Oct. 5, 1954 |
| 2,752,635 | Miller | July 3, 1956 |
| 2,858,881 | Newall et al. | Nov. 4, 1958 |
| 2,892,216 | Steel | June 30, 1959 |
| 2,898,634 | Alderfer | Aug. 11, 1959 |
| 2,901,773 | Talalay | Sept. 1, 1959 |

OTHER REFERENCES

Dombrow: "Polyurethanes," 1957 Rheinhold Pub. Co., N.Y., pp. 68–72; 88 and 89.

Rubber World, Vol. 139, No. 5, February 1959, pp. 685–692.

Polyurethanes, by R. E. Knox, a paper presented before the Division of Rubber Chemistry, A.C.S., Chicago, Ill., Sept. 11, 1958, Contribution No. 144 of Du Pont's Elastomer Chemicals Dept.